(12) United States Patent
Ai (10) Patent No.: US 9,681,291 B2
(45) Date of Patent: Jun. 13, 2017

(54) METHOD AND DEVICE FOR CONFIRMING IDLE STATE SIGNALLING REDUCTION (ISR)ACTIVATION (71) Applicant: China Academy of Telecommunications Technology, Beijing (CN)

(72) Inventor: Ming Ai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/432,008

(22) PCT Filed: Sep. 27, 2013

(86) PCT No.: PCT/CN2013/084471
§ 371 (c)(1),
(2) Date: Mar. 27, 2015

(87) PCT Pub. No.: WO2014/048368
PCT Pub. Date: Apr. 3, 2014

(65) Prior Publication Data
US 2015/0230079 A1 Aug. 13, 2015

(30) Foreign Application Priority Data

Sep. 27, 2012 (CN) .......................... 2012 1 0365878

(51) Int. Cl.
*H04W 4/00* (2009.01)
*H04W 8/20* (2009.01)
(Continued)

(52) U.S. Cl.
CPC ............ *H04W 8/205* (2013.01); *H04W 4/12* (2013.01); *H04W 8/04* (2013.01); *H04W 8/08* (2013.01); *H04W 8/12* (2013.01)

(58) Field of Classification Search
None
See application file for complete search history.

(56) References Cited

U.S. PATENT DOCUMENTS 8,441,985 B2 * 5/2013 Kim ...................... H04W 60/00
370/328
2011/0090848 A1 * 4/2011 Kim ...................... H04W 60/00
370/328
(Continued)

FOREIGN PATENT DOCUMENTS

CN 101291461 10/2008
CN 101448305 6/2009
(Continued)

OTHER PUBLICATIONS

International Search Report for PCT/CN2013/084471 mailed Jan. 2, 2014.
(Continued)

*Primary Examiner* — Kibrom T Hailu
(74) *Attorney, Agent, or Firm* — Foley & Lardner LLP; James F. Ewing; Paul M. H. Pua (57) ABSTRACT

A method and network device for confirming ISR activation, optimize the way of activating ISR to solve the defects of prior art that the characteristics of the ISR can not be fully utilized, caused by activating ISR only depending on the EMM combined procedures capability reported by UE. The method comprises: serving general packet radio service (GPRS) support node (SGSN) obtains the subscription data of user equipment (UE); and SGSN activates ISR for the UE when SGSN confirms there is no circuit switch (CS) domain subscription data in the UE's subscription data. Meanwhile, in the present invention other two methods and network devices for confirming ISR activation are also disclosed.

12 Claims, 6 Drawing Sheets

(51) Int. Cl.
*H04W 4/12* (2009.01)
*H04W 8/04* (2009.01)
*H04W 8/08* (2009.01)
*H04W 8/12* (2009.01)

(56) References Cited

U.S. PATENT DOCUMENTS

2011/0116449 A1* 5/2011 Hu .................. H04W 28/06 370/328
2012/0307732 A1* 12/2012 Olsson ............... H04W 64/00 370/328

FOREIGN PATENT DOCUMENTS

| CN | 101998310 | 3/2011 | |
|---|---|---|---|
| CN | 102098655 | 6/2011 | |
| CN | 102685921 | 9/2012 | |
| JP | WO 2012136374 A2 * | 10/2012 | ............ H04W 4/005 |
| SE | WO 2010051873 A1 * | 5/2010 | ............ H04W 8/24 |

OTHER PUBLICATIONS

Extended European Search Report for EP Application No. 13841027.9 mailed Oct. 6, 2015.

Huawei et al: "Clarification on paging via S3 and ISR activation for SGSN supporting PS only", 3GPP Draft; S2-121428, 3rd Generation Partnership Project (3GPP), Mobile Competence Centre ; 650, Route Des Lucioles ; F-06921 Sophia-Antipolis Cedex, France, vol. SA WG2, No. Bratislava , Slovakia; Apr. 16, 2012-Apr. 20, 2012, Apr. 11, 2012 (Apr. 11, 2012), XP050631930, [retrieved on Apr. 11, 2012].

ZTE: "ISR deactivation exception for PS only SMS", 3GPP Draft; S2-121053_PSOnly_ISR_Deactivation-R3, 3$^{rd}$ Generation Partnership Project (3GPP), Mobile Competence Centre ; 650, Route Des Lucioles ; F-06921 Sophia-Antipolis Cedex; France, vol. SA WG2, No. Vancouver, Canada; Feb. 6, 2012-Feb. 10, 2012, Feb. 10, 2012 {Feb. 10, 2012), XP050576885, [retrieved on Feb. 10, 2012].

* cited by examiner

METHOD AND DEVICE FOR CONFIRMING IDLE STATE SIGNALLING REDUCTION (ISR)ACTIVATION

This application is a US National Stage of International Application No. PCT/CN2013/084471, filed Sep. 27, 2013, designating the United States, and claiming the benefit of Chinese Patent Application No. 201210365878.6, filed with the Chinese Patent Office on Sep. 27, 2012 and entitled "Method and device for deciding activation of ISR", which are hereby incorporated by reference in their entireties.

FIELD

The present disclosure relates to the field of communication technologies and particularly to a method and device for deciding activation of Idle State Signaling Reduction (ISR).

BACKGROUND

In the prior art, in order to enable a Mobile Station, also referred as User Equipment (UE), to operate normally with Idle mode Signaling Reduction (ISR), Circuit Switched Fallback (CSFB), and interaction through a Short Message Service (SMS) over an SGs interface, a combined Evolved Packet System (EPS)/International Mobile Subscriber Identity (IMSI) attachment capability of the UE has been introduced, where this capability is reported unconditionally in that the capability is made to a Serving General Packet Radio Service (GPRS) Support Node (SGSN) as long as the UE is provided with this capability, that is, the UE needs to report the capability to the SGSN in a Route Area Update (RAU) procedure, and the SGSN deactivates ISR unconditionally upon knowledge of the capability of the UE. The "combined EPS/IMSI attachment capability" as referred to in this context is referred instead to as an "EMM combined procedure capability" in subsequent standardization (where the EMM stands for EPS Mobility Management), and both of them can be interchangeable used in this disclosure.

The following schemes have been proposed to optimize deactivation of ISR:

In a first scheme, deactivation of ISR is not optimized in the prior art;

In a second scheme, deactivation of ISR is optimized so that when the UE is configured to operate with the CSFB or SMSoverSGs feature, the UE reports that it is provided with this capability, and the SGSN deactivates ISR. However a drawback of this scheme lies in that it departs from such a principle that the capability of the UE needs to be reported statically and unconditionally.

In a third scheme, a new indicator is introduced to an RAU Request message to indicate whether the UE registers successfully combined EPS and non-EPS services with an Evolved Universal Mobile Telecommunication System (UMTS) Terrestrial Radio Access Network (E-UTRAN). If they are not registered successfully, then the SGSN can not deactivate ISR for the UE. However a drawback of this scheme lies in that there is additional signaling between the UE and the network and the interface has to be modified, thus resulting in incompatibility.

In a fourth scheme, a new indicator is added to interaction between the SGSN and a Mobility Management Entity (MME) for the MME to indicate to the SGSN whether an SGs interface is set up by the MME for the UE, and the SGSN judges from the indicator whether to deactivate ISR for the UE. A drawback of this scheme lies in there is additional signaling between the MME and the SGSN and the interface has to be modified, thus resulting in incompatibility.

In a fifth scheme, an ISR support bit to indicate a support of ISR between the MME and the SGSN is reused to indicate whether the MME can activate ISR for the UE. When the MME sets up an SGs interface for the UE, this bit is set to "NO", and the SGSN deactivates ISR in response to the indicating bit. A drawback of this scheme lies in that the ISR support bit is set by modifying what is indicated by the bit to currently refer to the capability of the MME to support ISR but to be independent of the UE.

At present no agreement has been made in the specification about any of the schemes above to optimize deactivation of ISR.

Such a Packet Switched (PS) domain-only (PS-only) feature has been introduced in the discussion of the R11 that is a feature related to a subscription attribute of a subscriber, that is, the UE is provided with a packet service and a short message service (where the short message service is transported over Non Access Stratum (NAS) signaling via the packet domain) over the network via the PS domain according to the subscription data of the subscriber. Since the subscription data of the UE does not limit in any way the capability of the UE used by the subscriber, the UE with a varying capability, e.g., the UE with the combined EPS/IMSI attachment capability is still useable to the subscriber. As per the existing specification, if the UE is provided with this capability, then the UE needs to report an indicator of the capability (i.e., the "combined EPS/IMSI attachment capability", also referred to as the "EMM combined procedure capability") unconditionally (i.e., statically), and the SGSN deactivates ISR for the UE upon reception of the indicator of the capability reported by the UE.

However if the subscription data of the subscriber of the UE is PS-only, then it will not be necessary to deactivate ISR because a benefit from the ISR feature, e.g., reduction in unnecessary signaling, energy conservation of the UE, etc., will be lost once ISR is deactivated. There has been absent in the prior art a specific solution to activation and deactivation of ISR according to the PS-only subscription attribute of the subscriber of the UE.

SUMMARY

Embodiments of the disclosure provide a method and network-side device for deciding activation of ISR so as to address the problem in the prior art of the impossibility to make full use of the ISR feature because ISR is deactivated only according to the EMM combined procedure capability reported by the UE and to optimize activation of ISR.

Particular technical solutions according to the embodiments of the disclosure are as follows:

A method for deciding activation of ISR includes:

obtaining, by a Serving General Packet Radio Service (GPRS) Support Node (SGSN), subscriber data of a User Equipment (UE); and activating, by the SGSN, ISR for the UE if it is determined that there is no Circuit Switched (CS) domain subscriber data in the subscriber data of the UE.

A network-side device includes:

an obtaining component configured to obtain subscriber data of a UE; and a determining component configured to determine whether there is CS domain subscriber data in the subscriber data of the UE, and if it is determined there is no CS domain subscriber data in the subscriber data of the UE, to activate ISR for the UE.

A network device includes:

an interface module configured to obtain subscriber data of a User Equipment (UE); and a processor configured to determine whether there is CS domain subscriber data in the subscriber data of the UE, and if it is determined there is no CS domain subscriber data in the subscriber data of the UE, to activate ISR for the UE.

With the technical solutions above, in the embodiments of the disclosure, the SGSN determines that there is no CS domain subscriber data in the subscriber data of the UE and activates ISR for the UE regardless of whether information reported by the UE includes an indicator indicating that the UE is provided with the EMM combined procedure capability to thereby avoid the problem in the prior art arising from deactivation of ISR only according to the EMM combined procedure capability reported by the UE and to optimize activation of ISR so as to avoid the drawback of unnecessary signaling, and power consumption of the UE, due to the impossibility to make full use of the ISR feature in the existing schemes to deactivate ISR.

A method for deciding activation of ISR includes:

determining, by an SGSN, a support of the SMSinSGSN feature by the SGSN or a support of the SMSinSGSN feature by a Mobile Management Entity (MME); and activating, by the SGSN, ISR for a UE upon determining that the UE requests for a predetermined type of service.

A network-side device includes:

a determining component configured to determine a support of the SMSinSGSN feature by the network-side device or a support of the SMSinSGSN feature by an MME; and a processing component configured to activate ISR for a UE upon determining that the UE requests for a predetermined type of service.

A network device includes:

a processor configured to determine a support of the SMSinSGSN feature by the network device or a support of the SMSinSGSN feature by a Mobility Management Entity (MME); and to activate ISR for a User Equipment (UE) upon determining that the UE requests for a predetermined type of service.

In the embodiments of the disclosure, the SGSN determines a support of the SMSinSGSN feature by itself and a support of the SMSinMME feature by a MME, and activates ISR for the UE regardless of whether information reported by the UE includes an indicator indicating that the UE is provided with the EMM combined procedure capability when determines that the UE requests for a predetermined type of service to thereby avoid the problem in the prior art arising from deactivation of ISR only according to the EMM combined procedure capability reported by the UE and to optimize activation of ISR so as to avoid the drawback of signaling, and power of the UE, wasted due to the impossibility to make full use of the ISR feature in the existing schemes to deactivate ISR.

A method for deciding activation of ISR includes:

determining, by an SGSN, all the following conditions are satisfied: an indicator of an HSS for a support of the SMSinSGSN feature is received, it is determined that an SMS-only Request message is carried in an RAU Request message of the UE, and the SGSN supports the SMSinSGSN feature; and activating, by the SGSN, ISR for the UE.

A network-side device includes:

a determining component configured to determine that all the following conditions are satisfied: an indicator of an HSS for a support of the SMSinSGSN feature is received, it is determined that an SMS-only Request message is carried in an RAU Request message of the UE, and the network-side device supports the SMSinSGSN feature; and a processing component configured to activate ISR for a UE.

A network device includes:

a processor configured to determine whether all the following conditions are satisfied: an indicator of a Home Subscriber Server (HSS) for a support of the SMSinSGSN feature is received, it is determined that an SMS-only Request message is carried in an RAU Request message of the UE, and the network device supports the SMSinSGSN feature; and if so, to activate ISR for a UE.

In the embodiments of the disclosure, the SGSN determines that there is no CS domain subscriber data in the subscriber data of the UE and activates ISR for the UE regardless of whether information reported by the UE includes an indicator indicating that the UE is provided with the EMM combined procedure capability to thereby avoid the problem in the prior art arising from deactivation of ISR only according to the EMM combined procedure capability reported by the UE and to optimize activation of ISR so as to avoid the drawback of signaling, and power of the UE, wasted due to the impossibility to make full use of the ISR feature in the existing schemes to deactivate ISR.

DETAILED DESCRIPTION OF THE EMBODIMENTS

The PS-only feature will be described below briefly.

The PS-only feature is such a subscription attribute that only a service available from the PS domain is accessible to a subscriber with this subscription attribute. When a UE initially accesses the network, a Home subscriber Server (HSS) notifies an MME/SGSN in an Insert Subscriber data (ISD) procedure that the subscriber is provided with the PS-only subscription attribute. Particularly the HSS indicates to the MME/SGSN in a network access mode that the subscriber has no Circuit Switched (CS) domain subscriber data and the UE of the subscriber can only access the PS domain. If PS domain subscriber data of the subscriber allows an access of the subscriber to a short message service, then the subscriber can transmit and receive a short message (SMS) over an NAS message via the PS domain.

In an access procedure to the second-generation (2G) mobile communication network or the third-generation (3G) mobile communication network, the respective network nodes (e.g., the SGSN and the HSS) exchange their respective capabilities to support the feature of transmitting and receiving an SMS over an NAS message via the PS domain, during interaction between the UE and the network. Particularly the SGSN transmits to the HSS an indicator which is referred to as an "SMSinSGSN offered" indicator (where the SMS stands for a Short Message Service; the SGSN stands for a Serving GPRS Support Node; the GPRS stands for a General Packet Radio Service; and the SMSinSGSN stands for a Short Message Service in the SGSN), and the HSS transmits to the SGSN an indicator which is referred to as an "SMSinSGSN support" indicator. In a particular protocol implementation, parameters and expressions of the "SMSinSGSN offered" indicator and the "SMSinSGSN support" indicator in the particular protocol are of no interest to the disclosure, so particular names of the parameters, and particular expressions thereof will not be described in this context.

In a particular implementation, if an S6 interface and a Diameter (i.e., a series of "Diameter Based Protocols" in the IETF RFC 3588) based protocol are applied between the SGSN and the HSS, then the HSS and the SGSN exchange their supports of the SMSinSGSN feature in an Update Location (UL) procedure. The SGSN indicates a support of the feature in an Update Location Request message transmitted to the HSS (that is, the message carries the SMSinSGSN offered indicator), and the HSS indicates a support of the feature in an Update Location Answer message transmitted to the SGSN (that is, the message carries the SMSinSGSN support indicator).

In a particular implementation, if a Gr interface and a Mobile Application Part (MAP) based protocol are applied between the SGSN and the HSS, then the HSS and the SGSN also exchange their SMSinSGSN capabilities. The SMSinSGSN offered indicator is involved in reporting by the SGSN its support of the feature; and the HSS transmits the SMSinSGSN support indicator to the SGSN in an Insert Subscriber Data (ISD) procedure to indicate a support of the feature by the HSS, and the HSS furthers transmits, to the SGSN, subscriber data of the subscriber, including information about whether the subscriber subscribes for the PS-only feature and whether the subscriber subscribes for an SMS service; and If the UE only needs a PS domain service and the feature of transmitting and receiving an SMS over an NAS message via the PS domain, then the UE carries the SMS-only feature in an Attach or RAU Request message to indicate it to the SGSN. The SGSN decides whether to carry an SMS support indicator to the UE in an Attach/RAU Accept message, based upon the SMSinSGSN support indicator, the subscriber data of the UE (that is, the UE subscribers for an SMS service), a support by the SGSN of the feature of transmitting and receiving an SMS over an NAS message via the PS domain, and the received SMS-only indicator of the UE, where the SMS support indicator indicates a support by the 2G/3G network of transmitting and receiving an SMS via an NAS message via the PS domain, and the UE will not be switched to the CS domain upon reception of the indicator.

The Circuit Domain (CS) Fall Back (CSFallBack) feature and the SMSoverSGs feature have been supported in a Long Term Evolution (LTE) system. In an Attach/TAU procedure, the UE needs to indicate to the network whether it requests for the SMS-only feature, and the MME provides the UE with an SMS service using the SMSoverSGs feature upon reception of the SMS-only request transmitted by the UE, that is, the MME indicates the SMS-only feature to the UE in the Attach/TAU Accept message. At this time an SMS is transmitted and received over an NAS message between the UE and the MME, an SGs interface between the MME and a Mobile Switching Center (MSC)/Visitor Location Register (VLR) (i.e., the MSC or the VLR), and an interface between the MSC/VLR and a Short Message Service-Service Center (SMS-SC), and the UE transmits and receives a short message without falling back to the CS domain.

In order to support the PS-only feature and a short message, the architecture option of SMSinMME (where the SMS stands for a Short Message Service, and the MME stands for a Mobility Management Entity), also referred to as the SMSinMME feature in this context, has been introduced. The SMSinMME feature is characterized in a short message transport interface introduced between the MME and the SMS-SC. At this time a short message is transmitted and received over an NAS message between the UE and the MME, and the interface between the MME and the SMS-SC. In an Attach/TAU procedure of the UE, the MME and the HSS exchange their respective capabilities to support the architecture option of SMSinMME. The MME indicates a capability to support the SMSinMME feature to the HSS in an Update Location procedure (that is, there is an SGd interface between the MME and the SMS-SC), and the HSS indicates a capability of the HSS to support the SMSinMME feature to the MME in an ISD procedure (the capability of the HSS to support the SMSinMME feature refers to that the HSS responds to a short message routing request of the SMS-SC by returning the address of the serving MME of the UE to the SMS-SC, and the SMS-SC can transmit a short message directly to the serving MME upon reception of the address of the MME), that is, the HSS transmits the "SMSinMME support" indicator to the MME in the ISD procedure. The MME indicates the SMS-only feature to the UE in a TAU Accept message according to the contents of the TAU Request message of the UE (i.e., whether the UE requests for an access to an SMS service) upon reception of the indicator.

The SMSinMME feature has been introduced by modifying only interaction between the network nodes, and signaling interaction between the UE and the MME has not be newly defined but only needs to be consistent with the parameters introduced for the CSFB feature. Thus the network side can apply the SMSoverSGs feature or the architecture option of SMSinMME dependent upon a deployment policy of a network operator but independent of the UE.

In the R11 specification, ISR will be deactivated for the UE unconditionally as long as the MME enables the SMSinMME feature for the UE. With respect to the PS-only feature described above, embodiments of the disclosure provide a method and network-side device for deciding activation of ISR so as to optimize the existing schemes to deactivate ISR for the benefit of better use of the ISR feature.

Preferred embodiments of the disclosure will be described below in details with reference to the drawings.

Figure 1:
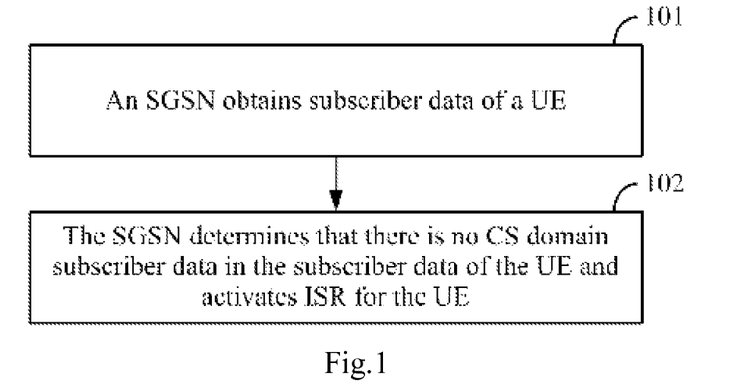
FIG. 1 illustrates a flow chart of a method for deciding activation of ISR according to a first embodiment of the disclosure.

As illustrated in FIG. 1, a first embodiment of the disclosure provides a method for deciding activation of ISR, and a particular flow of the method is as follows:

In the operation 101, an SGSN obtains subscriber data of a UE.

In the operation 102, the SGSN determines that there is no CS domain subscriber data in the subscriber data of the UE and activates ISR for the UE.

In the method for deciding activation of ISR according to this embodiment, as long as it is determined that there is no CS domain subscriber data in the subscriber data of the UE, no Gs interface between the SGSN and an MSC/VLR will be set up for the UE, ISR can be activated for the UE regardless of whether information reported by the UE includes an indicator indicating that the UE is provided with the EMM combined procedure capability.

Preferably in the embodiment of the disclosure, no Gs interface between the SGSN and the MSC/VLR will be set up for the UE, but the SGSN activates ISR for the UE if the SGNS determines that there is CS domain subscriber data in the subscriber data of the UE and the SGSN determines that all of the following three conditions are satisfied: an indicator of a Home Subscriber Server (HSS) for a support of the SMSinSGSN feature is received, it is determined that an SMS-only Request message is carried in an RAU Request message of the UE, and the SGSN supports the SMSinSGSN feature. The SGSN can activate ISR for the UE particularly as follows: if the SGSN determines a support of ISR by a Mobility Management Entity (MME), then the SGSN activates ISR for the UE regardless of whether information reported by the UE includes an indicator indicating that the UE is provided with the EMM combined procedure capability; otherwise, the SGSN will not activate ISR for the UE.

Preferably in the embodiment of the disclosure, the SGSN activates ISR for the UE if the SGNS determines that there is CS domain subscriber data in the subscriber data of the UE and the SGSN determines that one or more of the following three conditions can not be satisfied: an indicator of the HSS for a support of the SMSinSGSN feature is received, it is determined that an SMS-only Request message is carried in an RAU Request message of the UE, and the SGSN supports the SMSinSGSN feature, and it is determined that the UE requests for only a GPRS Routing Area update (GPRS ONLY RAU). The SGSN can activate ISR for the UE particularly as follows: if the SGSN determines a support of ISR by the MME, then the SGSN activates ISR for the UE; otherwise, the SGSN will not activate ISR for the UE regardless of whether information reported by the UE includes an indicator indicating that the UE is provided with the EMM combined procedure capability.

Preferably the SGSN will not activate ISR for the UE if the SGNS determines that there is CS domain subscriber data in the subscriber data of the UE and the SGSN determines that one or more of the following three conditions can not be satisfied: an indicator of the HSS for a support of the SMSinSGSN feature is received, it is determined that an SMS-only Request message is carried in an RAU Request message of the UE, and the SGSN supports the SMSinSGSN feature, and the SGSN determines that the UE requests for a combined GPRS Routing Area Update or Location Area Update (RAU/LAU) or the SGSN determines that a Gs interface is set up for the UE.

Particularly in an RAU procedure, if the SGSN activates ISR for the UE, then the SGSN carries both ISR activated information in a Context Acknowledge message and an ISR Activated indicator in an RAU Accept message; and if the SGSN does not activate ISR for the UE, then the SGSN carries neither ISR activated information in a Context Acknowledge message nor an ISR Activated indicator in an RAU Accept message.

Figure 2:
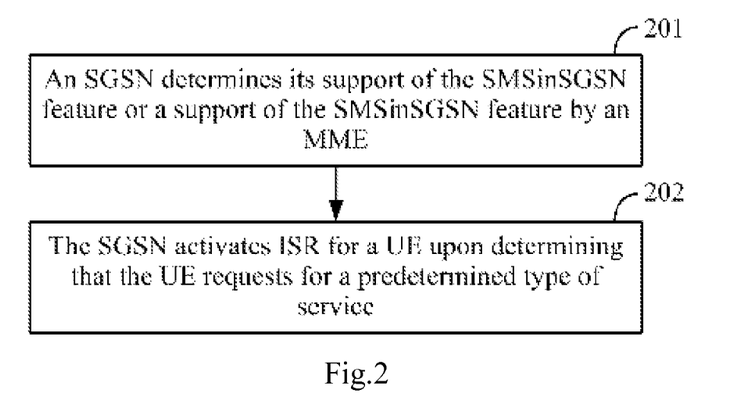
FIG. 2 illustrates a flow chart of a method for deciding activation of ISR according to a second embodiment of the disclosure.

As illustrated in FIG. 2, a second embodiment of the disclosure provides another method for deciding activation of ISR, and a particular flow of the method is as follows:

In the operation 201, an SGSN determines its support of the SMSinSGSN feature or a support of the SMSinSGSN feature by an MME.

In the operation 202, the SGSN activates ISR for a UE upon determining that the UE requests for a predetermined type of service.

Preferably the SGSN activates ISR for the UE upon determining that the UE requested for the predetermined type of service which is an SMS-only service or a GPRS Routing Area Update (RAU) regardless of whether information reported by the UE includes an indicator indicating that the UE is provided with the EMM combined procedure capability.

Where the SGSN can determine the support of the SMSinSGSN feature by the MME from an SMSinMME indicator in subscriber data of the UE or when the MME starts an SMSinMME function for the UE.

Particularly in a Context Request or Response (Req/Resp) procedure, if the SGSN determines that there is an SMSinMME indicator in the subscriber data of the UE or the SGSN determines that the MME starts the SMSinMME function for the UE, that is, the MME supports the SMSinSGSN feature, then it indicates that the UE neither transmits nor receives an SMS via an SGs interface at the LTE side but transmits and receives an SMS via an additional interface between the MME and an SMS-SC, so the SGSN will not take into account information reported by the UE includes an indicator indicating that the UE is provided with the EMM combined procedure capability. If the SGSN receives the indicator of a support of the SMSinSGSN feature and the SGSN supports the SMSinSGSN feature, and the SGSN determines that the UE requests for an SMS-only or GPRS RAU in an RAU Request message, then if the SGSN determines a support of ISR by the MME, then the SGSN activates ISR for the UE; otherwise, the SGSN will not activate ISR for the UE.

Figure 3:
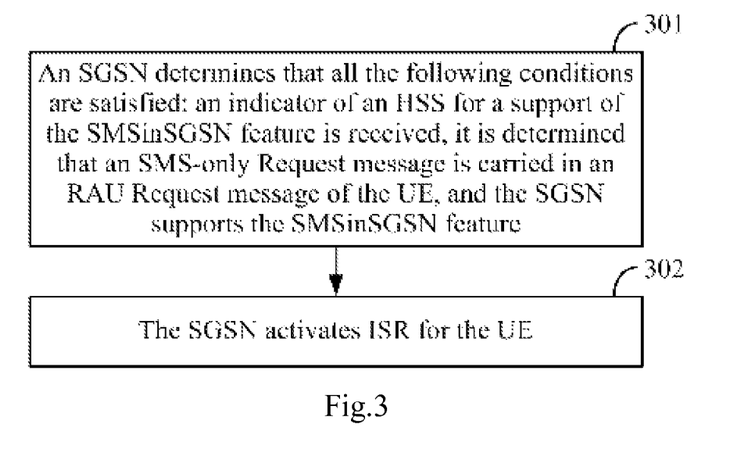
FIG. 3 illustrates a flow chart of a method for deciding activation of ISR according to a third embodiment of the disclosure.

As illustrated in FIG. 3, a third embodiment of the disclosure provides another method for determining activation of ISR, and a particular flow of the method is as follows:

In the operation 301, an SGSN determines that all the following conditions are satisfied: an indicator of an HSS for a support of the SMSinSGSN feature is received, it is determined that an SMS-only Request message is carried in an RAU Request message of the UE, and the SGSN supports the SMSinSGSN feature.

In the operation 302, the SGSN activates ISR for the UE.

Particularly no Gs interface between an SGSN and an MSC/VLR will be set up for the UE, but the SGSN activates ISR for the UE if an SGSN determines that all the following conditions are satisfied: an indicator of an HSS for a support of the SMSinSGSN feature is received, it is determined that an SMS-only Request message is carried in an RAU Request message of the UE, and the SGSN supports the SMSinSGSN feature. The SGSN can activate ISR for the UE particularly as follows: if the SGSN determines a support of ISR by an MME, then the SGSN activates ISR for the UE regardless of whether information reported by the UE includes an indicator indicating that the UE is provided with the EMM combined procedure capability; otherwise, the SGSN will not activate ISR for the UE.

Preferably in the embodiment of the disclosure, the SGSN activates ISR for the UE if the SGNS determines that one or more of the following three conditions can not be satisfied: an indicator of the HSS for a support of the SMSinSGSN feature is received, it is determined that an SMS-only Request message is carried in an RAU Request message of the UE, and the SGSN supports the SMSinSGSN feature, and it is determined that the UE requests for a GPRS ONLY Routing Area Update (RAU). The SGSN can activate ISR for the UE particularly as follows: if the SGSN determines a support of ISR by the MME, then the SGSN activates ISR for the UE; otherwise, the SGSN will not activate ISR for the UE regardless of whether information reported by the UE includes an indicator indicating that the UE is provided with the EMM combined procedure capability.

Preferably the SGSN will not activate ISR for the UE if the SGNS determines that there is CS domain subscriber data in the subscriber data of the UE and the SGSN determines that one or more of the following three conditions can not be satisfied: an indicator of the HSS for a support of the SMSinSGSN feature is received, it is determined that an SMS-only Request message is carried in an RAU Request message of the UE, and the SGSN supports the SMSinSGSN feature, and the SGSN determines that the UE requests for a combined GPRS Routing Area Update or Location Area Update (RAU/LAU) or the SGSN determines that a Gs interface is set up for the UE.

Particularly in an RAU procedure, if the SGSN activates ISR for the UE, then the SGSN carries both ISR activated information in a Context Acknowledge message and an ISR Activated indicator in an RAU Accept message; and if the SGSN does not activate ISR for the UE, then the SGSN carries neither ISR activated information in a Context Acknowledge message nor an ISR Activated indicator in an RAU Accept message.

Figure 4:
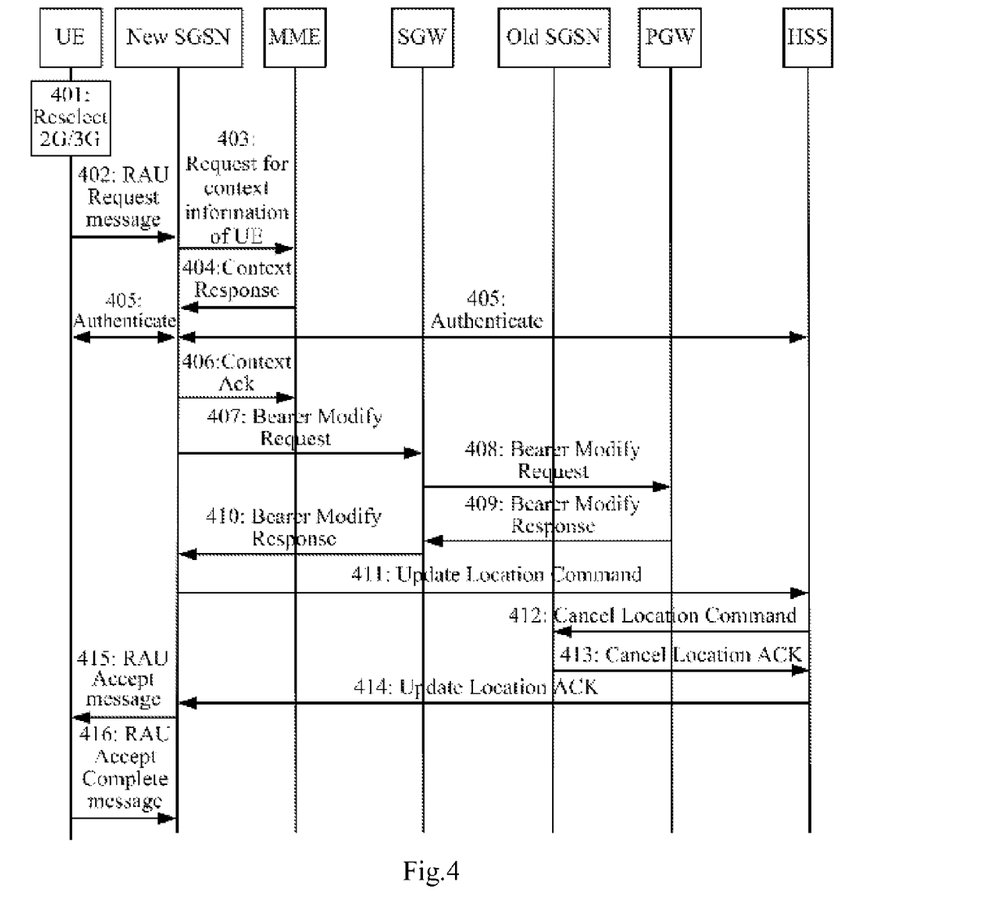
FIG. 4 illustrates a flow chart of a UE reselecting a 2G/3G according to an embodiment.

The method for deciding activation of ISR according to the disclosure will be described below in connection with particular embodiments thereof, and as illustrated in FIG. 4, there is illustrated a particular flow chart of a UE performing an attachment procedure at the LTE and subsequently reselects a 2G/3G network.

In the operation 401, a UE selects a 2G/3G network for an access;

In the operation 402, the UE transmits a RAU Request message to a new SGSN by carrying an SMS-only indicator in the RAU Request message to indicate that the UE only needs a PS domain service and an SMS service;

In the operation 403, the new SGSN transmits a Context Request message to an MME according to a UE identifier carried in the RAU Request message to request the MME for returning context information of the UE, including a mobility management context and a bearer related context;

In the operation 404, the MME returns to the new SGSN a Context Response message carrying the context information of the UE, and an indicator indicating a support of ISR by the MME and a Serving Gateway (SGW), i.e., an ISR support indicator;

In the operation 405, optionally the SGSN initiates an authentication procedure if it fails to verify the UE for its identity;

In the operation 406, the new SGSN transmits a Context ACK message to the MME to acknowledge reception of the context of the UE, where the ACK message carries an ISR Activated indicator indicating to the MME reservation of the context of the UE, i.e., reservation of registration information of the UE;

In the operation 407 to the operation 410, the new SGSN initiates a bearer modification procedure and performs this procedure together with the SGW, a PGW and other network entities;

In the operation 411, the new SGSN transmits to an HSS an Update Location command carrying an indicator notifying the HSS of a support of the SMSinSGSN feature by the SGSN;

In the operation 412, the HSS transmits a Cancel Location command to an old SGSN;

In the operation 413, the old SGSN transmits a Cancel Location ACK to the HSS;

In the operation 414, the HSS transmits an Update Location ACK message to the new SGSN to acknowledge registration of the UE with the SGSN, and if the HSS supports the SMSinSGSN feature, then an indicator indicating a support of the SMSinSGSN feature by the HSS needs to be carried in the message;

In the operation 415, the new SGSN transmits to the UE an RAU Accept message carrying an indicator of a support of the SMSinSGSN feature; and In the operation 416, the UE operates accordingly dependent upon whether the received RAU Accept message carries the ISR Activated indicator, and the UE transmits an RAU Complete message to the SGSN.

Figure 5:
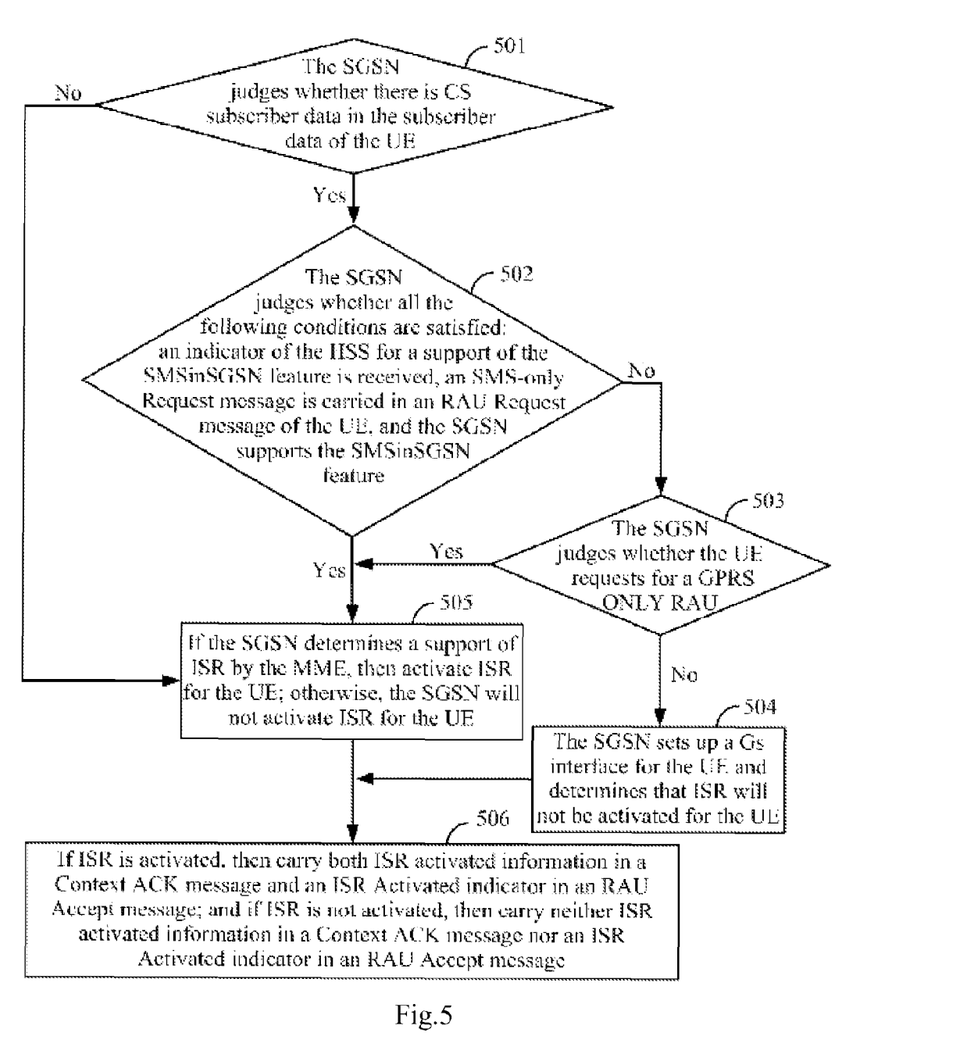
FIG. 5 illustrates a schematic chart of a flow performed by an SGSN according to the first embodiment.

In correspondence to the method for deciding activation of ISR according to the first embodiment of the disclosure, the RAU procedure is modified in the method by modifying the behavior of the SGSN. Particularly as illustrated in FIG. 5, the SGSN performs the following flow after the operation 405 and before the operation 415:

In the operation 501, the SGSN judges whether there is CS subscriber data in the subscriber data of the UE, and if not, then no Gs interface between the SGSN and the MSC or the VLR will be set up for the UE, and the flow jumps to the operation 505; and if so, then the flow proceeds to the operation 502;

In the operation 502, the SGSN judges whether all the following conditions are satisfied: an indicator of the HSS for a support of the SMSinSGSN feature is received, it is determined that an SMS-only Request message is carried in an RAU Request message of the UE, and the SGSN supports the SMSinSGSN feature, and if so, then no Gs interface between the SGSN and the MSC or the VLR will be set up for the UE, and the flow jumps to the operation 505; and if so, then the flow proceeds to the operation 503;

In the operation 503, the SGSN judges whether the UE requests for a GPRS ONLY RAU or a combined GPRS RAU/LAU, and if the UE requests for a GPRS ONLY RAU, then the flow jumps to the operation 505; and if the UE requests for a combined GPRS RAU/LAU, then the flow proceeds to the operation 504;

In the operation 504, the SGSN sets up a Gs interface for the UE and determines that ISR will not be activated for the UE and proceeds to the operation 506;

In the operation 505, the SGSN judges whether the MME supports ISR regardless of whether information reported by the UE includes an indicator indicating that the UE is provided with the EMM combined procedure capability, and if so, then the SGSN activates ISR for the UE; otherwise, the SGSN will not activate ISR for the UE;

In the operation 506, dependent upon a result of the operation 504 or 505, if ISR is activated, then the SGSN carries both ISR activated information in a Context Acknowledge message and an ISR Activated indicator in an RAU Accept message; and if ISR is not activated, then the SGSN carries neither ISR activated information in a Context Acknowledge message nor an ISR Activated indicator in an RAU Accept message.

Where if the SGSN proceeds to the operation 505, then it indicates that the SGSN does no set up a Gs interface between the SGSN and the MSC/VLR for the UE, so the SGSN judges whether the MME supports ISR regardless of whether information reported by the UE includes an indicator indicating that the UE is provided with the EMM combined procedure capability, and if so, then the SGSN activates ISR for the UE; otherwise, the SGSN will not activate ISR for the UE.

In correspondence to the method for determining ISR according to the second embodiment of the disclosure, the RAU procedure is modified in the method by modifying the behavior of the SGSN.

Particularly in correspondence to the operation 404 to the operation 407, in a Context Request or Response (Req/Resp) procedure, if the SGSN determines that there is an SMSinMME indicator in the subscriber data of the UE or the SGSN determines that the MME starts the SMSinMME function for the UE, then it indicates that the UE neither transmits nor receives an SMS via an SGs interface at the LTE side but transmits and receives an SMS via an additional interface between the MME and the SMS-SC, so the SGSN will not take into account information reported by the UE includes an indicator indicating that the UE is provided with the EMM combined procedure capability.

In the operation 414, If the SGSN receives the SMSinSGSN support indicator of the HSS (which indicates a support of the SMSinSGSN feature by the HSS) and the SGSN supports the SMSinSGSN feature, and the SGSN determines that the UE requests for an SMS-only or GPRS ONLY RAU in an RAU Request message, then the SGSN determines that ISR is activated for the UE; otherwise, the SGSN will not activate ISR for the UE.

Before the operation 415, the SGSN judges whether the MME supports ISR regardless of whether information reported by the UE includes an indicator indicating that the UE is provided with the EMM combined procedure capability, and if so, then the SGSN proceeds as follows: dependent upon a result of judging whether ISR is activated for the UE in the operation 414: if the result of the judgment is activation of ISR, then the SGSN carries an ISR Activated indicator in an RAU Accept message; otherwise, the SGSN will not carry an ISR Activated indicator in an RAU Accept message; and if the MME does not support ISR, then deactivation of ISR is determined, the SGSN will not carry an ISR Activated indicator in an RAU Accept message.

In correspondence to the method for deciding activation of ISR according to the third embodiment of the disclosure, the RAU procedure is modified in the method by modifying the behavior of the SGSN, and reference can be made to the description of the operations 502 to 506 above for details thereof, so a repeated description thereof will be omitted here.

Figure 6:
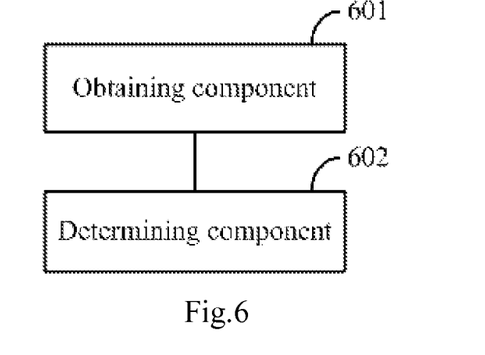
FIG. 6 illustrates a schematic structural diagram of a network-side device according to a fourth embodiment of the disclosure.

Based upon the same inventive idea, as illustrated in FIG. 6, a fourth embodiment of the disclosure further provides a network-side device, and reference can be made to the particular implementation of the SGSN in the first embodiment above of the disclosure for a particular implementation of the network-side device, so a repeated description thereof will be omitted here. The network-side device generally includes the following components:

An obtaining component 601 is configured to obtain subscriber data of a UE; and A determining component 602 is configured to determine that there is no CS domain subscriber data in the subscriber data of the UE and to activate ISR for the UE.

Preferably the determining component 602 is further configured:

To activate ISR for the UE if it is determined that there is CS domain subscriber data in the subscriber data of the UE and it is determined that all of the following conditions are satisfied: an indicator of an HSS for a support of the SMSinSGSN feature is received, it is determined that an SMS-only Request message is carried in an RAU Request message of the UE, and the network-side device supports the SMSinSGSN feature.

Preferably the determining component 602 is further configured:

To activate ISR for the UE if it is determined that one or more of the following conditions can not be satisfied: an indicator of the HSS for a support of the SMSinSGSN feature is received, it is determined that an SMS-only Request message is carried in an RAU Request message of the UE, and the network-side device supports the SMSinSGSN feature, and it is determined that the UE requests for a GPRS ONLY RAU.

Preferably the determining component 602 is further configured:

To activate no ISR for the UE if it is determined that one or more of the following conditions can not be satisfied: an indicator of the HSS for a support of the SMSinSGSN feature is received, it is determined that an SMS-only Request message is carried in an RAU Request message of the UE, and the network-side device supports the SMSinSGSN feature, and it is determined that the UE requests for a combined GPRS RAU/LAU or a Gs interface is set up for the UE.

Figure 7:
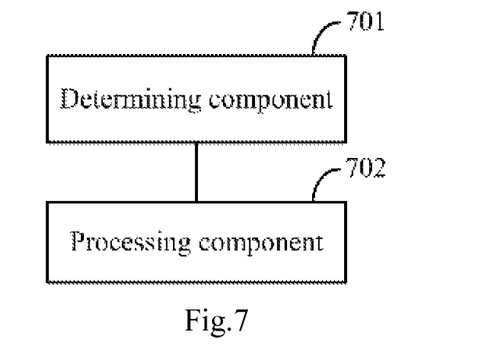
FIG. 7 illustrates a schematic structural diagram of a network-side device according to a fifth embodiment of the disclosure.

Based upon the same inventive idea, as illustrated in FIG. 7, a fifth embodiment of the disclosure further provides a network-side device, and reference can be made to the particular implementation of the SGSN in the second embodiment above of the disclosure for a particular implementation of the network-side device, so a repeated description thereof will be omitted here. The network-side device generally includes the following components:

A determining component 701 is configured to determine a support of the SMSinSGSN feature by the network-side device or a support of the SMSinSGSN feature by an MME; and A processing component 702 is configured to activate ISR for a UE upon determining that the UE requests for a predetermined type of service.

Particularly the processing component 702 is configured to activate ISR for the UE upon determining that the UE requests for an SMS-only or GPRS ONLY RAU.

Figure 8:
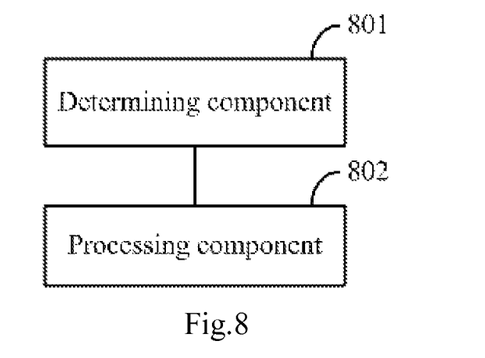
FIG. 8 illustrates a schematic structural diagram of a network-side device according to a sixth embodiment of the disclosure.

Based upon the same inventive idea, as illustrated in FIG. 8, a sixth embodiment of the disclosure further provides a network-side device, and reference can be made to the particular implementation of the SGSN in the third embodiment above of the disclosure for a particular implementation of the network-side device, so a repeated description thereof will be omitted here. The network-side device generally includes the following components:

A determining component 801 is configured to determine that all the following conditions are satisfied: an indicator of an HSS for a support of the SMSinSGSN feature is received, it is determined that an SMS-only Request message is carried in an RAU Request message of the UE, and the network-side device supports the SMSinSGSN feature; and A processing component 802 is configured to activate ISR for a UE.

Preferably the determining component 801 is further configured to instruct the processing component 802 to activate ISR for the UE if it is determined that one or more of the following conditions can not be satisfied: an indicator of the HSS for a support of the SMSinSGSN feature is received, it is determined that an SMS-only Request message is carried in an RAU Request message of the UE, and the network-side device supports the SMSinSGSN feature, and it is determined that the UE requests for a GPRS ONLY RAU.

Preferably the determining component 801 is further configured to instruct the processing component 802 not to activate ISR for the UE if it is determined that one or more of the following conditions can not be satisfied: an indicator of the HSS for a support of the SMSinSGSN feature is received, it is determined that an SMS-only Request message is carried in an RAU Request message of the UE, and the network-side device supports the SMSinSGSN feature, and it is determined that the UE requests for a combined GPRS Routing RAU/LAU or the network-side device determines that a Gs interface is set up for the UE.

Based upon the technical solutions, in the embodiments of the disclosure, the SGSN determines that there is no CS domain subscriber data in the subscriber data of the UE and activates ISR for the UE regardless of whether information reported by the UE includes an indicator indicating that the UE is provided with the EMM combined procedure capability to thereby avoid the problem in the prior art arising from deactivation of ISR only according to the EMM combined procedure capability reported by the UE and to optimize activation of ISR so as to avoid the drawback of signaling, and power of the UE, wasted due to the impossibility to make full use of the ISR feature in the existing schemes to deactivate ISR.

Also in the embodiments of the disclosure, when the SGSN determines its support of the SMSinSGSN feature or a support of the SMSinSGSN feature by the MME and determines that the UE requests for a predetermined type of service, the SGSN activates ISR for the UE regardless of whether information reported by the UE includes an indicator indicating that the UE is provided with the EMM combined procedure capability to thereby also avoid the problem in the prior art arising from deactivation of ISR only according to the EMM combined procedure capability reported by the UE and to optimize activation of ISR so as to avoid the drawback of signaling, and power of the UE, wasted due to the impossibility to make full use of the ISR feature in the existing schemes to deactivate ISR.

Moreover in the embodiments of the disclosure, when the SGSN determines all the following conditions are satisfied: an indicator of the HSS for a support of the SMSinSGSN feature is received, it is determined that an SMS-only Request message is carried in an RAU Request message of the UE, and the SGSN supports the SMSinSGSN feature, the SGSN activates ISR for the UE regardless of whether information reported by the UE includes an indicator indicating that the UE is provided with the EMM combined procedure capability to thereby also avoid the problem in the prior art arising from deactivation of ISR only according to the EMM combined procedure capability reported by the UE and to optimize activation of ISR so as to avoid the drawback of signaling, and power of the UE, wasted due to the impossibility to make full use of the ISR feature in the existing schemes to deactivate ISR.

Figure 9:
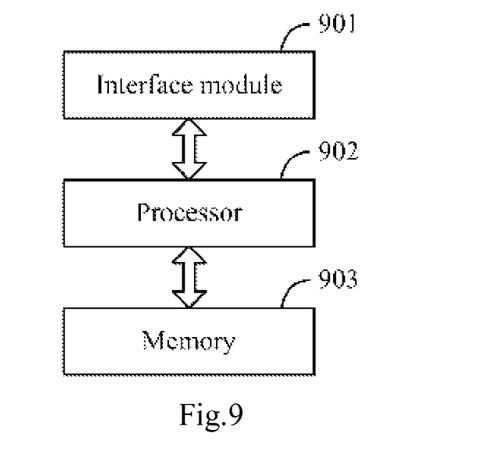
FIG. 9 illustrates a schematic structural diagram of a network device according to a seventh embodiment of the disclosure.

Based upon the same inventive idea, as illustrated in FIG. 9, a seventh embodiment of the disclosure further provides a network device, and reference can be made to the particular implementation of the SGSN in the first embodiment above of the disclosure for a particular implementation of the network device, so a repeated description thereof will be omitted here. The network device generally includes an interface module 901 and a processor and possibly also a memory 903, where:

The interface module 901 is configured to obtain subscriber data of a User Equipment (UE); and The processor 902 is configured to determine whether there is CS domain subscriber data in the subscriber data of the UE, and if not, to activate ISR for the UE.

Particularly the processor 902 can be configured to activate ISR for the UE if it is determined that there is CS domain subscriber data in the subscriber data of the UE and it is determined that all of the following conditions are satisfied: an indicator of a Home Subscriber Server (HSS) for a support of the SMSinSGSN feature is received, it is determined that an SMS-only Request message is carried in an RAU Request message of the UE, and the network device supports the SMSinSGSN feature.

Furthermore the processor 902 can be further configured to activate ISR for the UE if it is determined that one or more of the conditions and it is determined that the UE requests for a GPRS ONLY RAU.

Furthermore the processor 902 can be further configured to activate no ISR for the UE if it is determined that one or more of the conditions and it is determined that the UE requests for a combined GPRS RAU/LAU or a Gs interface is set up for the UE.

Figure 10:
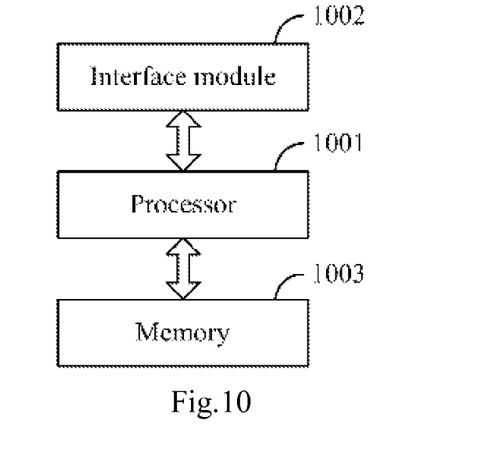
FIG. 10 illustrates a schematic structural diagram of a network device according to an eighth embodiment of the disclosure.

Based upon the same inventive idea, as illustrated in FIG. 10, an eighth embodiment of the disclosure further provides a network device, and reference can be made to the particular implementation of the SGSN in the second embodiment above of the disclosure for a particular implementation of the network device, so a repeated description thereof will be omitted here. The network device generally includes a processor 1001 and possibly also an interface module 1002 and a memory 1003, where:

The processor 1001 is configured to determine a support of the SMSinSGSN feature by the network device or a support of the SMSinSGSN feature by a Mobility Management Entity (MME); and to activate ISR for a User Equipment (UE) upon determining that the UE requests for a predetermined type of service.

Particularly the processor 1001 can be configured to activate ISR for the UE upon determining that the UE requests for an SMS-only or GPRS ONLY RAU.

Figure 11:
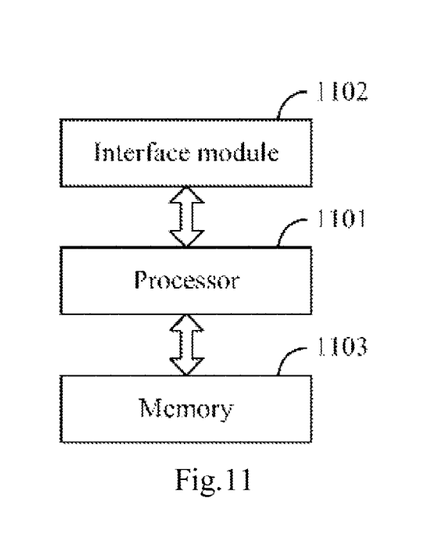
FIG. 11 illustrates a schematic structural diagram of a network device according to a ninth embodiment of the disclosure.

Based upon the same inventive idea, as illustrated in FIG. 11, a ninth embodiment of the disclosure further provides a network device, and reference can be made to the particular implementation of the SGSN in the third embodiment above of the disclosure for a particular implementation of the network device, so a repeated description thereof will be omitted here. The network device includes a processor 1101 and possibly also an interface module 1102 and a memory 1103, where:

The processor 1101 is configured to determine whether all the following conditions are satisfied: an indicator of a Home Subscriber Server (HSS) for a support of the SMSinSGSN feature is received, it is determined that an SMS-only Request message is carried in an RAU Request message of the UE, and the network device supports the SMSinSGSN feature; and if so, to activate ISR for a UE.

Furthermore the processor 1101 can be further configured to instruct the processing component to activate ISR for the UE if it is determined that one or more of the conditions and it is determined that the UE requests for a GPRS ONLY RAU.

Furthermore the processor 1101 can be further configured to instruct the processing component not to activate ISR for the UE if it is determined that one or more of the conditions can not be satisfied and it is determined that the UE requests for a combined GPRS Routing RAU/LAU or the network device determines that a Gs interface is set up for the UE.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for deciding activation of Idle State Signaling Reduction (ISR), comprising:
    obtaining, by a Serving General Packet Radio Service (GPRS) Support Node (SGSN), subscriber data of a User Equipment (UE); and
    activating, by the SGSN, ISR for the UE if the SGSN determines that the subscriber data of the UE comprises Circuit Switched (CS) domain subscriber data and the SGSN determines that all of the following conditions are satisfied: an indicator of a Home Subscriber Server (HSS) for a support of the Short Message Service in the SGSN (SMSinSGSN) feature is received, it is determined that an SMS-only Request message is carried in a Routing Area Update (RAU) Request message of the UE, and the SGSN supports the SMSinSGSN feature.

2. The method of claim 1, further comprising:
    activating, by the SGSN, ISR for the UE if the SGSN determines that one or more of the conditions can not be satisfied and determines that the UE requests for a GPRS ONLY RAU.

3. The method of claim 1, further comprising:
    activating, by the SGSN, no ISR for the UE if the SGSN determines that one or more of the conditions can not be satisfied and determines that the UE requests for a combined GPRS RAU or Location Area Update (LAU) (RAU/LAU) or the SGSN determines that a Gs interface is set up for the UE.

4. A method for deciding activation of Idle State Signaling Reduction (ISR), comprising:
    determining, by a Serving General Packet Radio Service (GPRS) Support Node (SGSN), all the following conditions are satisfied: an indicator from a Home Subscriber Server (HSS) for supporting the Short Message Service in the SGSN (SMSinSGSN) feature is received by the SGSN, it is determined that an SMS-only Request message is carried in an Routing Area Update (RAU) Request message of the UE, and the SGSN supports the SMSinSGSN feature; and
    activating, by the SGSN, ISR for the UE.

5. The method of claim 4, further comprising:
    activating, by the SGSN, ISR for the UE if the SGSN determines that one or more of the conditions can not be satisfied and determines that the UE requests for a GPRS ONLY RAU.

6. The method of claim 4, further comprising:
    activating, by the SGSN, no ISR for the UE if the SGSN determines that one or more of the conditions can not be satisfied and determines that the UE requests for a combined GPRS RAU/Location Area Update (LAU) or the SGSN determines that a Gs interface is set up for the UE.

7. A network device, comprising:
    an interface module configured to obtain subscriber data of a User Equipment (UE); and
    a processor configured to activate ISR for the UE if it is determined that the subscriber data of the UE comprises Circuit Switched (CS) domain subscriber data and it is determined that all of the following conditions are satisfied: an indicator of a Home Subscriber Server (HSS) for a support of the Short Message Service in the Serving General Packet Radio Service (GPRS) Support Node (SGSN) (SMSinSGSN) feature is received, it is determined that an SMS-only Request message is carried in a Routing Area Update (RAU) Request message of the UE, and the network device supports the SMSinSGSN feature.

8. The network device of claim 7, wherein the processor is configured:
    to activate ISR for the UE if it is determined that one or more of the conditions can not be satisfied and it is determined that the UE requests for a GPRS ONLY RAU.

9. The network device of claim 7, wherein the processor is configured:
    to activate no ISR for the UE if it is determined that one or more of the conditions and it is determined that the UE requests for a combined GPRS RAU/Location Area Update (LAU) or a Gs interface is set up for the UE.

10. A network device, comprising:
a processor configured to determine whether all the following conditions are satisfied: an indicator from a Home Subscriber Server (HSS) for supporting the Short Message Service in the Serving General Packet Radio Service (GPRS) Support Node (SGSN) (SMSinSGSN) feature is received by the network device, it is determined that an SMS-only Request message is carried in a Routing Area Update (RAU) Request message of the UE, and the network device supports the SMSinSGSN feature; and if the conditions are all satisfied, to activate Idle State Signaling Reduction (ISR) for a UE.

11. The network device of claim 10, wherein the processor is further configured to instruct the processing component to activate ISR for the UE if it is determined that one or more of the conditions and it is determined that the UE requests for a GPRS ONLY RAU.

12. The network device of claim 11, wherein the processor is further configured to instruct the processing component not to activate ISR for the UE if it is determined that one or more of the conditions can not be satisfied and it is determined that the UE requests for a combined GPRS Routing RAU/Location Area Update (LAU) or the network device determines that a Gs interface is set up for the UE.

* * * * *